No. 824,066. PATENTED JUNE 19, 1906.
W. R. COX.
COMBINED COTTON SCRAPER, BLOCKER, AND CULTIVATOR.
APPLICATION FILED AUG. 19, 1905.
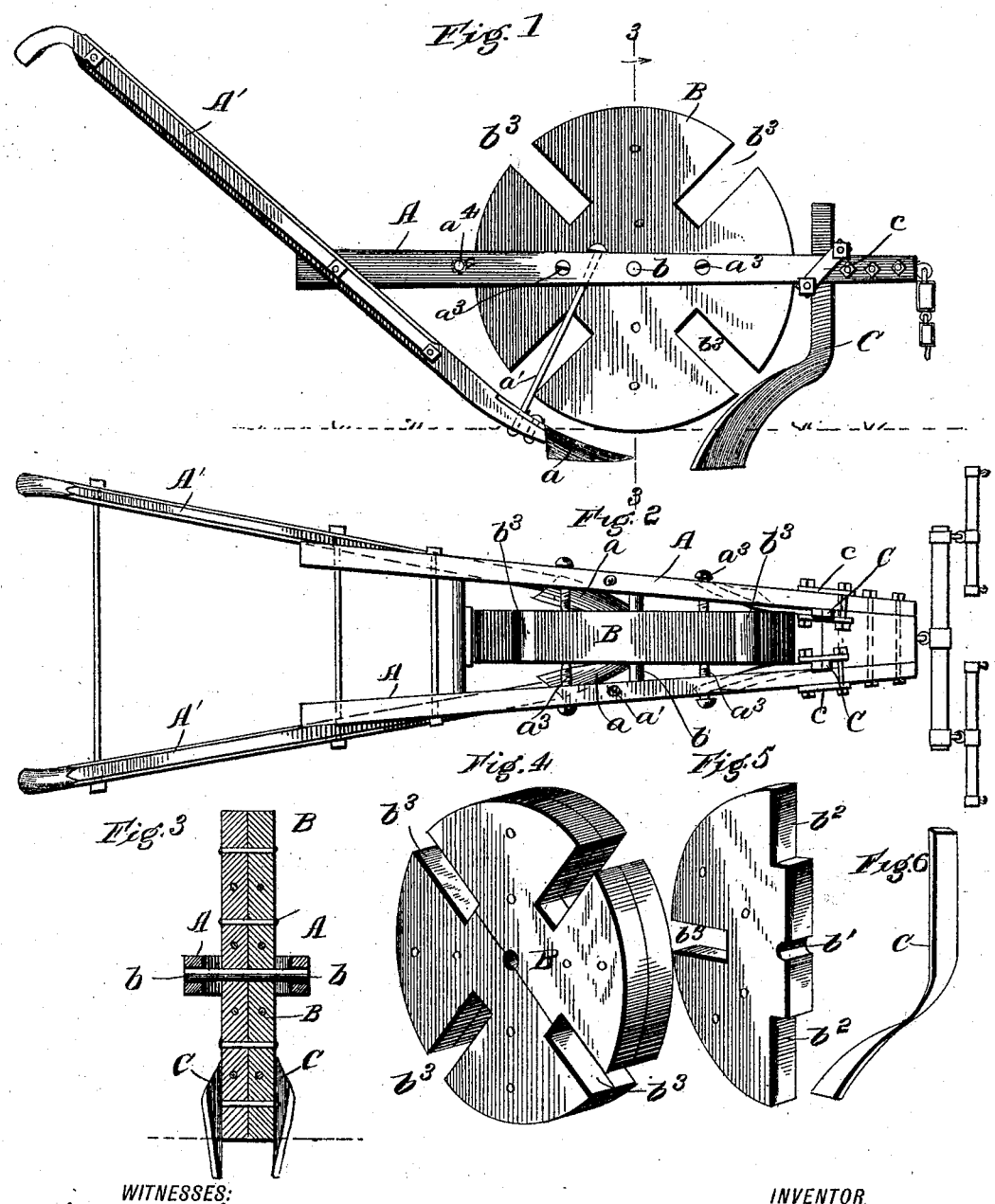
WITNESSES:
INVENTOR
WILLIAM R. COX
BY
ATTORNEYS

UNITED STATES PATENT OFFICE.

WILLIAM R. COX, OF WALDRON, ARKANSAS.

COMBINED COTTON SCRAPER, BLOCKER, AND CULTIVATOR.

No. 824,066.  Specification of Letters Patent.  Patented June 19, 1906.

Application filed August 19, 1905. Serial No. 274,916.

*To all whom it may concern:*

Be it known that I, WILLIAM R. COX, a citizen of the United States, and a resident of Waldron, in the county of Scott and State of Arkansas, have invented certain new and useful Improvements in a Combined Cotton Scraper, Blocker, and Cultivator, of which the following is a specification.

My invention relates to an improvement in combined cotton scrapers, blockers, and cultivators, combining the three implements in a single unitary machine, its object being to produce a machine which will scrape both sides of a cotton-row at the same time, thin the cotton by leaving it in blocks, and hill it up at the same time.

A further object is to produce a device by means of which any other crops planted in the drill can be cultivated in the same manner.

A further object is to provide a labor-saving device which shall be simple, cheap, and efficient.

To these ends my invention consists of certain novel features of construction, arrangement, and combinations of parts, as will be hereinafter fully described, and pointed out in the claims, reference being had to the accompanying drawings, in which—

Figure 1 is a side elevation of my improvement. Fig. 2 is a top plan view of the same. Fig. 3 is a vertical section taken on line 3 3 of Fig. 1. Fig. 4 is a perspective view of the blocker. Fig. 5 is a perspective view of a section of the blocker. Fig. 6 is a perspective view of a scraper-blade.

A represents the frame of the device provided with the handles A' at the rear and a clevis at its front end, to which an ordinary doubletree is hitched. The handles extend downwardly in a diagonal direction and carry at their lower ends the plows or cultivator-blades $a\ a$. $a'$ represents brace-rods extending from the frame to the plows.

B is a blocker-wheel journaled in the frame on an axle $b$. This blocker-wheel is composed of four sections made of hard wood, similar in shape to that shown in Fig. 5. Each section is provided with an opening $b^3$ and the cut-out portions $b^2$ and the semicircular opening $b'$ at its center, which, with the complementary opening in the opposite section, forms an opening for the axle $b$. These four sections are put together in the manner shown in Fig. 4 and held securely by nails or screws, so that four blocker-openings $b^3$ are formed in the periphery of the wheel which is designed to roll on the ground.

As stated, the wheel is journaled on an axle fitted in the frame, and in the frame at each side of the wheel and in front and to the rear of the axle are fitted the set-screws $a^3$ to prevent wabbling or side motion of the wheel on the axle while rolling. $a^4$ represents a cleaner fitted in the frame immediately in the rear of the wheel.

C represents scraper-blades adjustably secured to the frame immediately in front of the wheel A and to each side of the same. These scrapers are made of steel bars bent backwardly and having the lower ends flattened out and twisted, as shown in Figs. 3 and 6, the right scraper being twisted to the right and the left scraper twisted to the left and set opposite each other. $c$ represents clamps which secure the scrapers to the frame. These scrapers are designed to scrape both sides of a row at the same time and cover up the vegetation in the middle of the row.

The operation of my improvement is as follows: The team being hitched to the doubletree, as the machine is drawn along the scrapers will scrape both sides of a row, at the same time lifting the earth and covering up the vegetation in the middle of the row. The roller will crush all the plants except where the openings $b^3$ are brought opposite the plants, which will enter said openings and are not acted upon, but are "blocked" off. The plows $a$ then throw the earth up around the plants and covers up the crushed cotton and vegetation. The cleaner $a^4$ takes off any earth that may be carried up by the periphery of the wheel.

My improved cotton scraper, blocker, and cultivator scrapes all vegetation from the cotton to the center of the row and covers it up, leaving a space about three or four inches for the blocker-wheel to thin to a stand. The rear scraper scrapes up just enough dirt to cover the cotton crushed down by the blocker-wheel and hill up the cotton left standing, after which in a suitable time—say ten or fifteen days—the scrapers and blocker-wheels can be detached and foot-pieces and shovel-plows attached to the rear end of the beams and the rear ends of the beams separated to widen the frame and the cotton plowed a second time, and so on.

Having thus described my invention, what

I claim as new, and desire to secure by Letters Patent, is—

1. In an agricultural implement comprising a frame and a radially-recessed blocker-wheel mounted to rotate in said frame, and adjustable means mounted in said frame, to limit the transverse movement of said wheel.

2. In a cotton scraper, blocker and cultivator, the combination with a frame, of vertically-disposed front right and left scrapers secured to said frame, a radially-recessed blocker-wheel, adjustable means mounted in said frame at each side of the wheel for preventing transverse motion of said wheel, and right and left cultivator-blades secured to said frame to the rear of said blocker-wheel.

3. In a cotton scraper, blocker and cultivator, the combination with a frame, of vertically-disposed front right and left scrapers secured to said frame, a radially-recessed blocker-wheel, and a horizontally-disposed cleaner or scraper in the rear of the blocker-wheel and adjacent thereto.

WILLIAM R. COX.

Witnesses:
M. C. MALONE,
A. WILLIAMS.